United States Patent
Villella et al.

(10) Patent No.: US 9,091,583 B2
(45) Date of Patent: Jul. 28, 2015

(54) FLUID LEVEL SENSOR SYSTEM AND METHOD

(71) Applicant: Amphenol Corporation, Wallingford, CT (US)

(72) Inventors: David Allen Villella, St. Mary's, PA (US); David John Geer, St. Mary's, PA (US)

(73) Assignee: AMPHENOL THERMOMETRICS, INC., St. Marys, PA (US)

( * ) Notice: Subject to any disclaimer, the term of this patent is extended or adjusted under 35 U.S.C. 154(b) by 428 days.

(21) Appl. No.: 13/679,144

(22) Filed: Nov. 16, 2012

(65) Prior Publication Data

US 2014/0137645 A1    May 22, 2014

(51) Int. Cl.
*G01F 23/22*    (2006.01)

(52) U.S. Cl.
CPC ...................... *G01F 23/22* (2013.01)

(58) Field of Classification Search
CPC .................. G01F 23/22; G01F 23/246–23/248
USPC ......................................................... 73/295
See application file for complete search history.

(56) References Cited

U.S. PATENT DOCUMENTS

| | | | |
|---|---|---|---|
| 5,201,223 A * | 4/1993 | McQueen | 73/295 |
| 6,662,429 B1 * | 12/2003 | Domorazek | 29/593 |
| 2005/0120791 A1 * | 6/2005 | Carlson et al. | 73/295 |
| 2008/0041152 A1 | 2/2008 | Schoenberg | |
| 2008/0083275 A1 | 4/2008 | Bremmer et al. | |

\* cited by examiner

*Primary Examiner* — Peter Macchiarolo
*Assistant Examiner* — Nathaniel Kolb
(74) *Attorney, Agent, or Firm* — Blank Rome LLP

(57) ABSTRACT

A fluid level sensor system includes a thermal path component disposed at least partially within a fluid containing volume, the thermal path component including a heat source operably coupled thereto and a control temperature sensor for sensing a control temperature of the thermal path component. Also included is a reference temperature sensor for sensing a reference ambient temperature. Further included is a controller in operable communication with the control temperature sensor, the heat source and the reference temperature sensor, wherein the controller maintains a predetermined temperature difference between the control temperature and the reference ambient temperature by controlling the heat source, wherein an energy level required to maintain the predetermined temperature difference is converted to a fluid level within the fluid containing volume.

17 Claims, 2 Drawing Sheets

FLUID LEVEL SENSOR SYSTEM AND METHOD

BACKGROUND OF THE INVENTION

The subject matter disclosed herein relates to fluid containing volumes, and more particularly to a fluid level sensor system, as well as a method of measuring a fluid level.

It is typically advantageous to measure relatively static fluid levels in a variety of fluid containing volumes. Numerous approaches have been employed to measure fluid levels and have traditionally consisted of mechanical devices, such as a float connected to a potentiometer. A float rides on an upper surface of fluid in the fluid containing volume and is typically connected to one end of a pivot arm, while another end of the pivot arm typically includes a wiper mechanism. The wiper mechanism brushes against a resistive strip when the pivot arm moves due to changes in fluid level. Resistance of the resistive strip changes when the wiper mechanism moves, with the resistance displayed on an indicator to indicate the fluid level. Mechanical components are prone to wearing and failure due to the moving nature of the mechanical components, as well as interaction with associated mechanical parts.

BRIEF DESCRIPTION OF THE INVENTION

According to one aspect of the invention, a fluid level sensor system includes a thermal path component at least partially disposed within a fluid containing volume, the thermal path component including a heat source operably coupled thereto and a control temperature sensor for sensing a control temperature of the thermal path component. Also included is a reference temperature sensor for sensing a reference ambient temperature. Further included is a controller in operable communication with the control temperature sensor, the heat source and the reference temperature sensor, wherein the controller maintains a predetermined temperature difference between the control temperature and the reference ambient temperature by controlling the heat source, wherein an energy level required to maintain the predetermined temperature difference is converted to a fluid level within the fluid containing volume.

According to another aspect of the invention, a method of measuring a fluid level is provided. The method includes detecting a reference ambient temperature and a control temperature of a thermal path component disposed within a fluid containing volume. Also included is maintaining a predetermined temperature difference between the control temperature and the reference ambient temperature by heating the thermal path component with a heat source operably coupled to the thermal path component. Further included is determining an energy level required to maintain the predetermined temperature difference. Yet further included is converting the energy level to a proportional output indicating the fluid level within the fluid containing volume.

According to yet another aspect of the invention, a fluid level sensor includes a thermal path component having a first end and a second end. Also included is a control temperature sensor operably coupled to the thermal path component proximate the first end for detecting a control temperature of the thermal path component. Further included is a heat source operably coupled to the thermal path component proximate the second end, wherein the heat source is in communication with a controller and is configured to provide heat to the thermal path component a predetermined amount upon receiving a command from the controller, wherein the power required to heat the thermal path component the predetermined amount corresponds to a fluid level.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description discloses embodiments of the invention, together with advantages and features, by way of example with reference to the drawings.

DETAILED DESCRIPTION OF THE INVENTION

Figure 1:
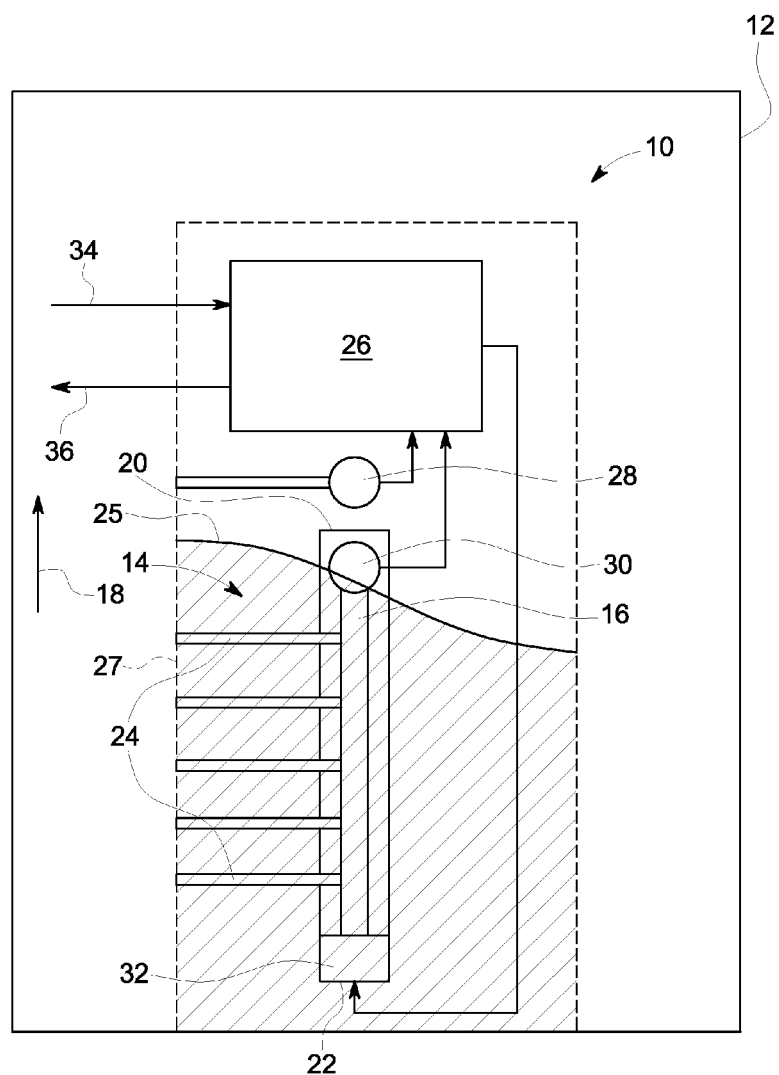
FIG. 1 is a schematic illustration of a fluid level sensor system.

Referring to FIG. 1, a fluid level sensor system 10 is schematically illustrated. The fluid level sensor system 10 is employed in conjunction with a fluid containing volume 12 that contains a fluid 14. The fluid 14 may be any fluid, such as fuel (gas, liquid or liquid/gas mixture), for example. These are merely illustrative examples of fluids that may be disposed within the fluid containing volume 12. The fluid containing volume 12 may be in the form of any number of volumes intended to contain the fluid 14, such as a fuel container. Furthermore, the fluid containing volume 12 may be a fully enclosed volume or a partially open tank. As will be described in detail below, the fluid level sensor system 10 is configured to detect and indicate a fluid level of the fluid 14 within the fluid containing volume 12.

Disposed within the fluid containing volume 12 is a thermal path component 16 that is at least partially immersed in the fluid 14 when the fluid 14 is present within the fluid containing volume 12. In the illustrated embodiment, the thermal path component 16 is oriented in a substantially vertical manner as indicated by an arrow 18. It is to be appreciated that the thermal path component 16 may be oriented in alternative alignments, such as at an angle relative to the arrow 18. The thermal path component 16 may be formed in a variety of geometries as well.

In an exemplary embodiment, the thermal path component 16 comprises a substantially linear or planar geometry. It can be appreciated that the fluid level sensor system 10 may include a plurality of thermal path components 16 in the fluid containing volume 12.

The thermal path component 16 includes a first end 20 and a second end 22, as well as a plurality of heat dissipating paths 24 operably coupled thereto and vertically spaced in a linear array. The thermal path component 16 is constructed such that heat can easily be transferred from the heat source 32 to a control temperature sensor 30 and can be of any thermally conductive material such as copper or aluminum, for example. The thermal path component 16 can comprise an electrical trace on a circuit board or can be a structure to which the plurality of heat dissipating paths 24 can be attached. Each of the plurality of heat dissipating paths 24 are immersed in the fluid 14 when the fluid containing volume 12 is at or near a full level. In the illustrated embodiment, the fluid level is shown as immersing all of the heat dissipating paths 24. As the fluid 14 is consumed and the fluid level is decreased, an upper surface 25 of the fluid 14 translates from a more full level to a more empty level toward the second end 22 of the thermal path component 16. Upon such a decrease in fluid level, one or more of the plurality of heat dissipating paths 24 is no longer immersed in the fluid 14. Each of the plurality of heat dissipating paths 24 is configured to dissipate heat from the thermal path component 16. It is to be appreciated that the plurality of heat dissipating paths 24 are in operable communication via contact with a common surface 27, such as a surface of the fluid level sensor system 10. Such a common contact allows linear averaging of the heat dissipation for all fluid levels between each of respective pairs of the plurality of heat dissipating paths 24, thereby providing for more accurate fluid level detection over the entire range of fluid levels.

The fluid level sensor system 10 includes a controller 26 comprising a plurality of electronic components configured to distribute and receive information to and from a variety of components of the fluid level sensor system 10. The controller 26 is configured to monitor various parameters of the fluid level sensor system 10 and control intended functionality of one or more components of the fluid level sensor system 10. The controller 26 is in operable communication with a reference temperature sensor 28 that may be disposed in the fluid containing volume 12 or at an external location to the fluid containing volume 12. In either event, the reference temperature sensor 28 is located remotely from the fluid 14. The reference temperature sensor 28 is configured to detect a reference temperature that corresponds to an ambient temperature either within or external to the fluid containing volume 12. The controller 26 receives information from the reference temperature sensor 28 to monitor the reference temperature.

The controller 26 is also in operable communication with a control temperature sensor 30 that is disposed proximate the first end 20 of the thermal path component 16. The control temperature sensor 30 is configured to detect a control temperature that corresponds to the temperature of the thermal path component 16. It is contemplated that the control temperature sensor 30 may be in contact with the fluid 14, depending on the fluid level of the fluid 14. The controller 26 receives information from the control temperature sensor 30 to monitor the control temperature. Upon receipt of the information from the reference temperature sensor 28 and the control temperature sensor 30, the controller 26 is configured to calculate an actual temperature difference between the reference temperature and the control temperature. The actual temperature difference is compared to a predetermined temperature difference that is input into the controller 26. Such a calculation and/or comparison may be facilitated, at least in part, by an OP-AMP comparator of the controller 26. In one embodiment, the predetermined temperature difference ranges from about 40° F. (about 4° C.) to about 50° F. (about 10° C.), however, the predetermined temperature difference may be outside of the example provided above. An acceptable range comprising the predetermined temperature difference may be input into the controller 26 to provide for inherent system variation.

The controller 26 determines if the actual temperature difference is not within the acceptable range of the predetermined temperature difference. In the event the actual temperature difference is determined to be outside of the acceptable range, the controller 26 initiates an increase or decrease of heat transfer to the thermal path component 16 by controlling at least one heat source 32 disposed proximate the second end 22 of the thermal path component 16. The controller 26 receives an input energy source 34, such as an input voltage to provide energy to the at least one heat source 32 for heat transfer to the thermal path component 16. The level of energy necessary to maintain the predetermined temperature difference is monitored and converted to a fluid level of the fluid 14. Specifically, the controller 26 is set to convert the level of energy provided to the at least one heat source 32 to a known proportional fluid level 36 for indication to a user or system. It is to be appreciated that the controller 26 includes a plurality of settings that may be manipulated by an operator. Desired settings typically vary depending on the particular type of the fluid 14 disposed within the fluid containing volume 12, based on a dependency of the response of the fluid level sensor system 10 on characteristics specific to the fluid 14. For example, the thermal conductivity, or ability to dissipate heat, of the fluid 14 will impact the response of the fluid level sensor system 10, such that alteration of the settings of the controller 26 is beneficial.

In operation, as the fluid level increases or decreases, more or fewer of the plurality of heat dissipating paths 24 are immersed in the fluid 14, thereby altering the energy level required to maintain the actual temperature difference within an acceptable, predetermined range. The energy level required provides an indication of the fluid level in the fluid containing volume 12 and such a level is indicated to a user or system. It is to be appreciated that the fluid level sensor system 10 may operate with a fluid 14 at a hotter or colder temperature than that of the reference temperature. For the case of the fluid 14 having a relatively hotter temperature than the reference temperature, it can be appreciated that as the fluid level decreases, fewer of the plurality of heat dissipating paths 24 are immersed in the fluid 14, such that an increased energy level is required to maintain an acceptable actual temperature difference. Conversely, if the fluid 14 is at a relatively colder temperature than the reference temperature, a decreased energy level is required. The opposite is true for each example when the fluid level is increased.

Figure 2:
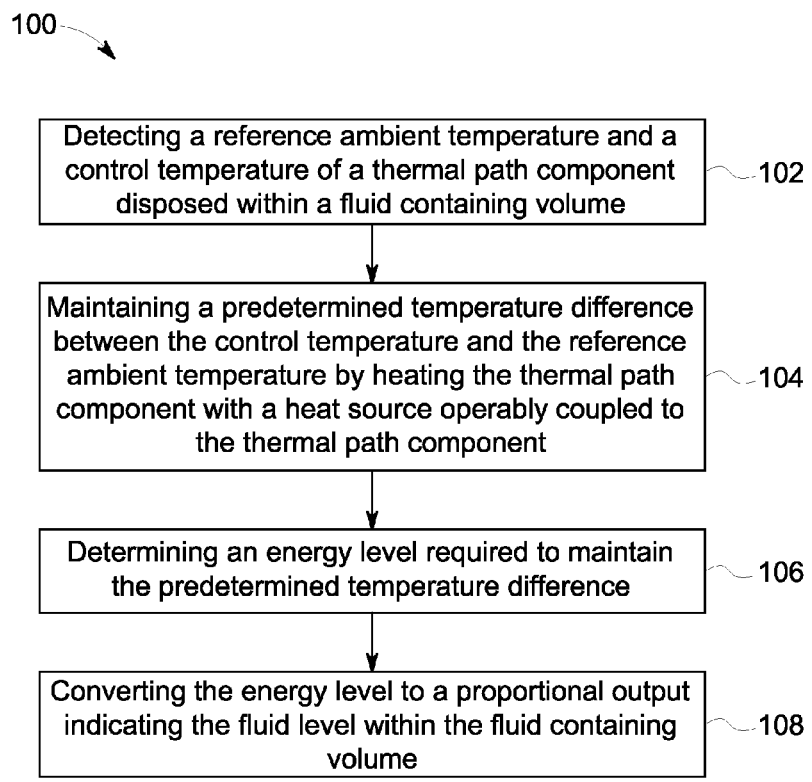
FIG. 2 is a flow diagram illustrating a method of measuring a fluid level.

As illustrated in the flow diagram of FIG. 2, and with reference to FIG. 1, a method of measuring a fluid level 100 is also provided. The fluid level sensor system 10 has been previously described and specific structural components need not be described in further detail. Although several aspects of the method of measuring a fluid level 100 have been described in detail above, in conjunction with the detailed description of the fluid level sensor system 10, the flow diagram of FIG. 2 provides illustrative detail for carrying out the method, at least in part. The method of measuring a fluid level 100 includes detecting a reference ambient temperature and a control temperature of a thermal path component disposed within a fluid containing volume 102. A predetermined temperature difference between the control temperature and the reference ambient temperature is maintained by heating the thermal path component with a heat source operably coupled to the thermal path component 104. An energy level required to maintain the predetermined temperature difference is determined 106 and the energy level is converted to a proportional output indicating the fluid level within the fluid containing volume 108.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fluid level sensor system comprising:
a thermal path component at least partially disposed within a fluid containing volume, the thermal path component including a heat source operably coupled thereto and a control temperature sensor for sensing a control temperature of the thermal path component, wherein the thermal path component is aligned in a relatively vertical manner within the fluid containing volume, the thermal path component comprises a first end and a second end, and wherein the control temperature sensor is disposed proximate the first end and the heat source is disposed proximate the second end;
a reference temperature sensor for sensing a reference ambient temperature; and
a controller in operable communication with the control temperature sensor, the heat source and the reference temperature sensor, wherein the controller maintains a predetermined temperature difference between the control temperature and the reference ambient temperature by controlling the heat source, wherein an energy level required to maintain the predetermined temperature difference is converted to a fluid level within the fluid containing volume.

2. The fluid level sensor system of claim 1, wherein the reference temperature sensor is disposed within the fluid containing volume.

3. The fluid level sensor system of claim 1, further comprising a plurality of heat dissipation paths coupled to the thermal path component.

4. The fluid level sensor system of claim 1, further comprising a plurality of heat dissipation paths coupled to the thermal path component, the plurality of heat dissipation paths arranged in a linear array and aligned in the relatively vertical manner of the thermal path component.

5. The fluid level sensor system of claim 1, wherein the fluid containing volume comprises a fuel container.

6. The fluid level sensor system of claim 1, further comprising a plurality of thermal path components at least partially disposed within the fluid containing volume.

7. The fluid level sensor system of claim 1, wherein the thermal path component comprises a thermally conductive material.

8. The fluid level sensor system of claim 1, wherein the thermal path component comprises a plurality of heat dissipation points extending outwardly as a plurality of heat dissipating paths, each of the plurality of heat dissipating paths configured to provide a heat transfer to the thermal path component.

9. The fluid level sensor system of claim 8, wherein the heat transfer provided to the thermal path component by each of the plurality of heat dissipating paths is lower when at least one of the plurality of heat dissipating paths is immersed in the fluid.

10. The fluid level sensor system of claim 1, wherein the energy level is converted to a voltage proportional to the fluid level.

11. A method of measuring a fluid level comprising:
providing a fluid level sensor according to claim 1;
detecting the reference ambient temperature and the control temperature of the thermal path component disposed within the fluid containing volume;
maintaining the predetermined temperature difference between the control temperature and the reference ambient temperature by heating the thermal path component with the heat source operably coupled to the thermal path component;
determining the energy level required to maintain the predetermined temperature difference; and
converting the energy level to a proportional output indicating the fluid level within the fluid containing volume.

12. The method of claim 11, further comprising dissipating heat from the thermal path component through a plurality of heat dissipating paths upon exposure of the plurality of heat dissipating paths as the fluid level decreases.

13. The method of claim 11, further comprising providing an input voltage to a controller in operable communication with the heat source.

14. The method of claim 11, wherein the energy level comprises a voltage indicating the fluid level.

15. The method of claim 11, further comprising calculating an actual temperature difference between the control temperature and the reference ambient temperature.

16. The method of claim 15, further comprising initiating heat transfer to the thermal path component through the heat source if the actual temperature difference is not within an acceptable range comprising the predetermined temperature difference.

17. A fluid level sensor comprising:
a thermal path component having a first end and a second end;
a control temperature sensor operably coupled to the thermal path component proximate the first end for detecting a control temperature of the thermal path component; and
a heat source operably coupled to the thermal path component proximate the second end, wherein the heat source is in communication with a controller and is configured to provide heat to the thermal path component of a predetermined amount upon receiving a command from the controller, wherein the power required to heat the thermal path component the predetermined amount corresponds to a fluid level.

* * * * *